US008301295B2

(12) United States Patent
Frankenberg et al.

(10) Patent No.: US 8,301,295 B2
(45) Date of Patent: Oct. 30, 2012

(54) METHOD AND ARRANGEMENT OF DEVICES FOR PROCESSING MAIL ITEMS ADDRESSED TO POST OFFICE BOX SYSTEMS WITHIN A POSTAL TRANSPORTATION AND MAIL DISTRIBUTION SYSTEM

(75) Inventors: Steffen Frankenberg, Rheinbach (DE); Flavio Alario, Bonn (DE); Rebekka Alario, Bonn (DE)

(73) Assignee: Deutsche Post AG, Bonn (DE)

( * ) Notice: Subject to any disclaimer, the term of this patent is extended or adjusted under 35 U.S.C. 154(b) by 656 days.

(21) Appl. No.: 12/513,995

(22) PCT Filed: Nov. 9, 2007

(86) PCT No.: PCT/EP2007/009717

§ 371 (c)(1),
(2), (4) Date: Oct. 6, 2009

(87) PCT Pub. No.: WO2008/058676

PCT Pub. Date: May 22, 2008

(65) Prior Publication Data

US 2010/0057247 A1 Mar. 4, 2010

(30) Foreign Application Priority Data

Nov. 13, 2006 (DE) ........................ 10 2006 053 671

(51) Int. Cl.
*G06F 7/00* (2006.01)
*G06F 17/00* (2006.01)
*G06K 9/00* (2006.01)

(52) U.S. Cl. ........ 700/224; 700/223; 700/214; 700/215; 700/216; 700/237; 700/242; 700/243; 209/583

(58) Field of Classification Search ........................ None
See application file for complete search history.

(56) References Cited

U.S. PATENT DOCUMENTS

| | | | | |
|---|---|---|---|---|
| 6,974,928 | B2 * | 12/2005 | Bloom | 209/583 |
| 2002/0156645 | A1 * | 10/2002 | Hansen | 705/1 |
| 2005/0004877 | A1 | 1/2005 | McLellan et al. | |
| 2005/0068178 | A1 * | 3/2005 | Lee et al. | 340/569 |

FOREIGN PATENT DOCUMENTS

| | | | |
|---|---|---|---|
| DE | 4130033 | A1 | 3/1993 |
| DE | 19644163 | A1 | 5/1998 |
| DE | 10007897 | C1 | 6/2001 |
| EP | 1053798 | B1 | 7/2004 |
| EP | 1421537 | B1 | 2/2005 |
| WO | WO03/034293 | A1 | 4/2003 |

* cited by examiner

*Primary Examiner* — Gene Crawford
*Assistant Examiner* — Yolanda Jones
(74) *Attorney, Agent, or Firm* — International IP Law Group, PLLC

(57) ABSTRACT

A system and method for processing mailpieces within a mail transportation and distribution system includes first and second distribution centers, and an electronic parcel compartment facility located near the second center. Data, about the mailpiece and recipient, is acquired from the mailpiece. Destination information for a compartment facility is associated with the mailpiece. The information is compared with a registered customer database. A re-routing instruction is ascertained from the customer data. The second center is ascertained. The mailpiece is sorted in the first center based on the destination. Data about the mailpiece and destination is transmitted to a second data processor of the second center. The mailpiece is transported to the second center. Information identifying the mailpiece is acquired with a reading device. The destination is determined based on information identifying the mailpiece, which is sorted based on the destination. The information is transmitted to a mobile device.

11 Claims, 1 Drawing Sheet

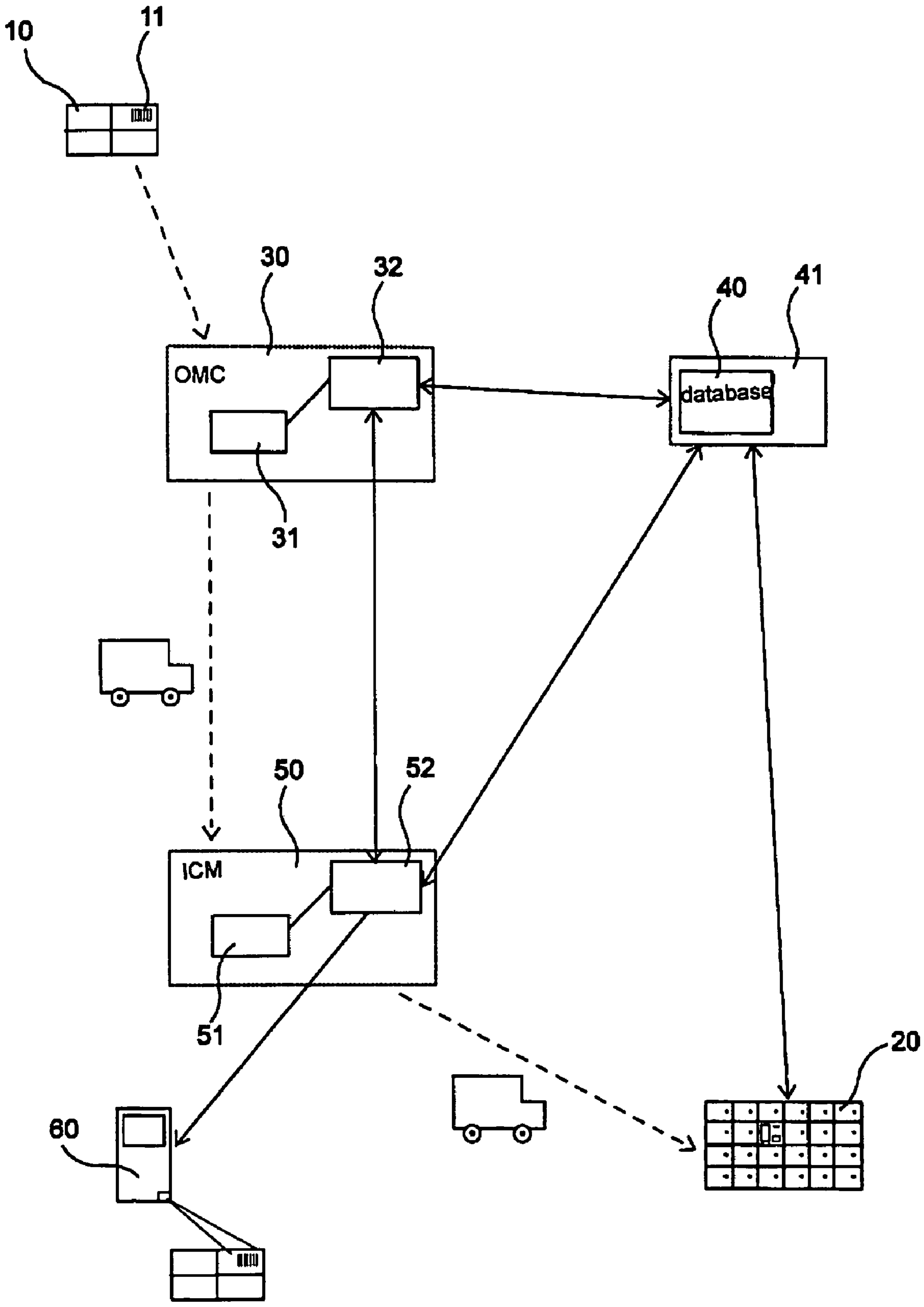
10
11
30
32
40
41
OMC
database
31
50
52
ICM
51
60
20

METHOD AND ARRANGEMENT OF DEVICES FOR PROCESSING MAIL ITEMS ADDRESSED TO POST OFFICE BOX SYSTEMS WITHIN A POSTAL TRANSPORTATION AND MAIL DISTRIBUTION SYSTEM

CROSS REFERENCE TO RELATED APPLICATIONS

Pursuant to 35 U.S.C. §371, this application is the United States National Stage Application of International Patent Application No. PCT/EP2007/009717, filed on Nov. 9, 2007, the contents of which are incorporated by reference as if set forth in their entirety herein, which claims priority to German (DE) Patent Application No. 10 2006 053 671.1, filed Nov. 13, 2006, the contents of which are incorporated by reference as if set forth in their entirety herein.

BACKGROUND

In the postal sector, various methods are known in which re-routing instructions pertaining to the mailpieces are ascertained. For instance, German Preliminary Published Application DE 196 44 163 A1 discloses a method and a device for the online processing of mailpieces that are to be forwarded. In this process, an image of the mailpiece is taken and the mailpiece is transported to an intermediate storage area. Following a digitalization procedure, the areas containing the information of interest are ascertained and the forwarding stipulations, the name and address of the recipient as well as—if a deliverer has marked it as “return to sender”—the address of the sender are all read. The results are checked in a database. Recipient names and recipient addresses that cannot be unambiguously read by means of the OCR reader are given priority and evaluated by means of video encoding of the images of the mailpieces. The new recipient address is printed on the mailpiece in a readable and encoded manner.

German patent DE 100 07 897 C1 discloses another method for the distribution of mailpieces. This method provides that, after the mailpiece has been dropped off, the surfaces of the mailpiece containing the addresses are scanned, the recipient information is read and the ascertained data about the recipient is searched in a re-routing database where the re-routing instructions containing names and delivery addresses are stored. The party giving the instruction receives an identifier that is also a searchable constituent of the stored re-routing instruction. When a re-routing instruction is found, the mailpieces are stored under the appertaining identifier and under a consecutive number, in addition to which the shipping service makes information about received mailpieces electronically available to the party giving the instruction. The party giving the instruction electronically informs the shipping service to which delivery addresses the mailpieces are to be sent during a certain period of time or whether information about the contents of the mailpieces should be made electronically available. The mailpieces are returned to the shipment process and a machine-readable code for the selected delivery address is applied onto the mailpieces. If information is requested about the mailpiece contents, the mailpieces are opened, the contents are scanned and made electronically available to the party giving the instruction.

European patent EP 1 053 798 B1 likewise discloses a method to forward mailpieces in which the mailpieces are addressed to a virtual post office box so that they can be delivered directly to a recipient.

Moreover, European patent EP 1 421 537 B1 of this applicant discloses a method to convey mailpieces using electronic parcel compartment facilities. Here, the delivery address of a mailpiece is acquired and changed according to a routine prescribed by the recipient, whereby the routine involves making an association among several delivery times and delivery addresses. At least one delivery address comprises an electronic parcel compartment facility or a compartment of such a parcel compartment facility. If delivery to a parcel compartment facility is requested, the delivery address is also changed as a function of free compartments in the parcel compartment facility. Therefore, if a customer selects delivery to a parcel compartment facility for a certain period of time, the mailpiece is re-addressed to the selected parcel compartment facility. However, if no compartment is free at the facility selected by the customer, the mailpiece is re-routed to a parcel compartment facility that has free compartments.

In the case of the methods known from of the state of the art that entail taking into account re-routing instructions within mail transportation and distribution systems, it is normally provided that a new address is applied onto a mailpiece as soon as the mailpiece is re-addressed. This calls for additional work and is a relatively inflexible handling approach since a mailpiece has to be provided with a new destination address if it needs to be re-addressed once again. Particularly when it comes to re-routing parcels to electronic parcel compartment facilities, however, it can often happen that, if it is ascertained, for example, that no free compartment is available at a facility selected by the customer, then the parcel has to be re-addressed to an alternative parcel compartment facility.

However, if no new address is applied onto a mailpiece, but rather if the mailpiece is then merely sorted on the basis of the re-routing instruction and routed within the mail transportation and distribution system, this has the drawback that the processing personnel and especially the deliverers of the mailpieces are not given any clear information as to whether a mailpiece was correctly re-routed or merely incorrectly sorted.

SUMMARY OF THE INVENTION

An exemplary embodiment of the present invention relates to a method for processing mailpieces within a mail transportation and distribution system comprising at least a first mail distribution center, a second mail distribution center and an electronic parcel compartment facility located in the area of the second mail distribution center. In this context, data present on the mailpiece is acquired by a reading device in the first mail distribution center. The acquired data comprises at least information that unambiguously identifies the mailpiece as well as information about the recipient of the mailpiece. This acquired data is transmitted to a first data processing unit located in the area of the first mail distribution center, where it is processed. On the basis of a database connected to the data processing unit, re-routing instructions given by the ascertained recipient are taken into consideration.

An exemplary embodiment of the present invention also relates to an arrangement of devices for carrying out the method.

In addition, an exemplary embodiment of the present invention relates to a method for processing mailpieces within a mail transportation and distribution system with which instructions for re-routing to electronic parcel compartment facilities can be dealt with in a simple and effective manner. In particular, the personnel in charge of the transportation and distribution should be given the requisite information about the re-routing.

A method for processing mailpieces within a mail transportation and distribution system according to an exemplary embodiment of the present invention comprises at least a first mail distribution center, a second mail distribution center and an electronic parcel compartment facility located in the area of the second mail distribution center. In this process, data present on the mailpiece is acquired by a reading device in the first mail distribution center. The acquired data is at least information that unambiguously identifies the mailpiece as well as information about the recipient of the mailpiece. The data thus acquired is transmitted to a first data processing unit located in the area of the first mail distribution center.

The method according to an exemplary embodiment of the present invention also comprises a procedure in which the data processing unit of the first mail distribution center compares the data indicating the recipient of the mailpiece with data about registered customers stored in a database. On the basis of the acquired data about the recipient, the data processing unit then ascertains and provides a data record that is stored for a customer in the database. The data record of the customer yields a re-routing instruction, and destination information for an electronic parcel compartment facility is associated with information that unambiguously identifies the mailpiece. Furthermore, a second mail distribution center located in the area of the electronic parcel compartment facility is ascertained, and the mailpiece is sorted in the first mail distribution center on the basis of the destination information.

The data acquired from the mailpiece and the destination information are transmitted by the data processing unit of the first mail distribution center to a data processing unit of the second mail distribution center. The mailpiece is transported to the second mail distribution center located in the area of the electronic parcel compartment facility, and the information that unambiguously identifies the mailpiece is once again acquired by another reading device of the second mail distribution center. On the basis of the information that unambiguously identifies the mailpiece, the data processing unit determines the destination of the mailpiece and the mailpiece is sorted in the second mail distribution center on the basis of the destination information. Moreover, the information that unambiguously identifies the mailpiece as well as the associated destination information are transmitted to a mobile device.

In a preferred exemplary embodiment of the invention, once a re-routing instruction has been ascertained from the data record of the customer and once destination information has been associated with an electronic parcel compartment facility, a compartment in the appropriate parcel compartment facility is reserved. The reservation of a compartment in the electronic parcel compartment facility for the mailpiece can be made by the data processing unit of the first mail distribution center or by the data processing unit of the second mail distribution center.

The mobile device according to an exemplary embodiment of the present invention preferably comprises a screen and device to acquire the information that unambiguously identifies the mailpiece. In an exemplary embodiment of invention, the destination information that is associated with the information that unambiguously identifies the mailpiece is displayed on the screen at the time when this information is acquired from the mailpiece.

In a preferred exemplary embodiment of the invention, the information that unambiguously identifies the mailpiece comprises data that is encrypted in a barcode. The identification information can also be stored in an RFID transponder.

In an exemplary embodiment of the invention, a shipment notice is sent to the parcel compartment facility and, of the data that is present on the mailpiece and that was detected by the reading device in the first mail distribution center, at least the information that unambiguously identifies the mailpiece as well as the data about the recipient of the mailpiece are transmitted to the parcel compartment facility before the mailpiece is deposited into the parcel compartment facility. Preferably, an additional notice to the customer is generated containing the information that a mailpiece for the customer is scheduled to be available at the parcel compartment facility within the next few hours. This notice can be generated either by the first or by the second mail distribution center.

An exemplary embodiment of the present invention also encompasses an arrangement of devices for processing mailpieces, whereby the arrangement comprises at least a first mail distribution center, a second mail distribution center and an electronic parcel compartment facility. The first and the second mail distribution centers each have a reading device for acquiring data present on a mailpiece and they each have a data processing unit to process the acquired data. The arrangement also comprises a database that is in communication with the first and/or second mail distribution center, where re-routing instructions from registered recipients are stored. At least the data processing unit of the first mail distribution center has a device to ascertain destination information from a re-routing instruction of a registered recipient and device to associate this destination information with information that unambiguously identifies the mailpiece. The data processing unit of the first mail distribution center also has a device to transmit the data acquired by the reading device to the data processing unit of the second mail distribution center. The mobile device is in communication with the data processing unit of the second mail distribution center and this data processing unit comprises a device to transmit to the mobile device at least the information that unambiguously identifies the mailpiece and the associated destination information.

In a preferred exemplary embodiment of the invention, the database is in communication with a central management unit that has a device to store and query the occupation status of the compartments of at least one parcel compartment facility.

Preferably, the data processing unit of the first mail distribution center, the data processing unit of the second mail distribution center and/or the central management unit have a device to transmit the data acquired by a reading device in the first mail distribution center to at least one parcel compartment facility.

BRIEF DESCRIPTION OF THE DRAWING

FIG. 1 is a block diagram showing an arrangement of a device according to an exemplary embodiment of the present invention within a mail transportation and distribution system.

DETAILED DESCRIPTION OF SPECIFIC EMBODIMENTS

The exemplary embodiment shown in FIG. 1 comprises at least a first mail distribution center 30 that is also referred to as an outgoing mail center OMC, and a second mail distribution center 50 that is also referred to as an incoming mail center IMC. The system preferably encompasses more than two mail distribution centers that cover the entire geographical area of the mail transportation and distribution system.

A mail distribution center can function both as an outgoing mail center and as an incoming mail center. When a mailpiece is dropped off at a location A by a customer and is to be delivered to a destination address at a location B, the mail distribution center in the vicinity of location A functions as the outgoing mail center OMC while a mail distribution center at location B functions as the incoming mail center IMC. Conversely, if a mailpiece is dropped off at location B and is to be delivered to location A, the mail distribution center in the vicinity of location B functions as the outgoing mail center while the mail distribution center at location A functions as the incoming mail center.

Therefore, the steps of the method according to an exemplary embodiment of the present invention that transpire within the mail distribution centers are not limited to specific hysically present buildings, but rather, can take place in various arrangements. Thus, the arrangement of devices to carry out the method according to an exemplary embodiment of the present invention shown in FIG. 1 is likewise not restricted to specific physically present buildings in a given location but rather, the designations “incoming and outgoing mail centers” refer to the specific procedures that take place in the centers.

For instance, a rough sorting of incoming mailpieces according to destinations of mail distribution centers is carried out in an outgoing mail center. The sorted mailpieces are transported to various destination mail distribution centers where they undergo fine sorting, for example, according to street names and house numbers. After the fine sorting, the mailpieces are handed over to a deliverer for a given delivery run. Thus, each mail distribution center functions as an outgoing mail distribution center in that it distributes the dropped-off mailpieces to other mail distribution centers, and as an incoming mail distribution center in that it sorts the mailpieces received from other mail distribution centers so that they can then be delivered.

The steps of the method according to an exemplary embodiment of the present invention are explained on the basis of the embodiment shown in FIG. 1. The devices within the mail distribution centers shown in FIG. 1, however, can execute the method steps according to the invention when a mailpiece comes in as well as when a mailpiece goes out. Therefore, when mailpieces arrive at location B, the mail distribution center 50 located there becomes the outgoing mail distribution center and the functions of the components and connections presented in FIG. 1 change accordingly.

In the exemplary embodiment of the invention shown in FIG. 1, a mailpiece 10 is provided with an unambiguous mailpiece identification 11. Preferably, this mailpiece identification 11 is at least a barcode containing encrypted information that unambiguously identifies the mailpiece in the system. Instead of a barcode, it is also possible to employ three-dimensional encryption matrices or information in plain text for purposes of unambiguously identifying the mailpiece. It is likewise possible to identify a mailpiece using an RFID transponder.

The mailpiece 10 is typically a parcel which, due to its dimensions, does not fit into the mailbox of a recipient, so that the recipient can choose instead to have it delivered to an electronic parcel compartment facility 20. The customer, however, can also select delivery to a parcel compartment facility for other types of mailpiece such as letters, so that the invention is not limited to the processing of parcels. Thus, the possibility exists, for example, for a customer to arrange to have mailpieces sent to any desired parcel compartment facility that is nearby, for example, when he is traveling for business or on vacation.

The mail transportation and distribution system preferably encompasses several parcel compartment facilities that are distributed over the entire system. In a practical manner, there is at least one parcel compartment facility situated in the area of each mail distribution center. It is more advantageous, however, to arrange several parcel compartment facilities in the area of a mail distribution center or of a city so that as many places for deliveries as possible can be provided for customers.

Electronic parcel compartment facilities entail the advantage that the recipient does not have to be present at his home address at the time of delivery in order to receive the mailpiece. Rather, the mailpiece can be sent to a parcel compartment facility of his choice and can be deposited into a compartment there. Preferably, the recipient receives a notification about the delivery and can then pick up the mailpiece from the parcel compartment facility at a time that is convenient for him.

Parcel compartment facilities can normally be used by registered and/or non-registered recipients of mailpieces. Within the scope of an exemplary embodiment of the present invention, however, it has proven to be advantageous for a customer to be registered, so that a re-routing instruction submitted by him can be used to process the mailpieces.

If parcels are transported and delivered within the system, the barcode 11 is located, for example, on a label that has been applied onto the parcel. The label can be applied by the sender himself, by a post office and, in individual cases, also by a mail distribution center. The barcode serves to unambiguously identify the mailpiece, thus making it possible to track the mailpiece in the system.

After the mailpiece 10 has been received in the mail transportation and distribution system, the mailpiece is transferred to a first mail distribution center which then functions as an outgoing mail center 30 for this mailpiece. At the outgoing mail center, a reading device 31 reads the information on the mailpiece that unambiguously identifies the mailpiece. The reading device 31 is, for instance, a parcel-address reading system, or else, individual processing stations in a mail distribution center read information from mailpieces and transmit this to a central computer in the mail distribution center.

If a barcode is used to identify a mailpiece, the information is read with a scanner. In contrast, if an RFID transponder is used, the information stored in it is acquired by an associated reading device. The information that unambiguously identifies a mailpiece will also be referred to hereinafter as the parcel ID.

Moreover, the reading device 31 ascertains information about the recipient of the mailpiece. This information can be acquired, for instance, by OCR reading devices and then processed by a data processing unit 32. In a preferred exemplary embodiment of the invention, a recipient identifier is applied onto the mailpiece and it can be machine-read by the reading device. This identifier is, for example, the customer ID of a recipient who is registered in the system. The customer ID can likewise be applied onto the mailpiece in encrypted form or in plain text. For instance, the customer ID of a recipient was indicated when merchandise was ordered, so the sender can apply the customer ID in the area of the address field on the mailpiece in order to send it. If no customer ID has been applied, then, for example, the customer name and address that are present in plain text on the mailpiece can be read.

Moreover, additional address information such as street name, house number, postal code or the dimensions of a mailpiece can be acquired and processed by various systems.

The ascertained parcel ID is sent together with information about the recipient to a data processing unit 32 that is in communication with the outgoing mail center 30. The data processing unit has access to a customer database 40 where re-routing instructions provided by the customer are stored. The database 40 can be located within the outgoing mail center. Preferably, however, it is arranged in a central management unit 41, so that all mail distribution centers of the system have access to the database.

The data processing unit queries to the database 40 as to whether a re-routing instruction has been stored for the acquired customer ID. This preferably refers to an instruction to the effect that a mailpiece should be delivered to a parcel compartment facility selected by the customer. In this context, the customer might have submitted several delivery routines, so that different parcel compartment facilities can be indicated for different periods of time.

If the mailpiece was originally addressed to the home address of the customer, the mailpiece is then re-routed to a parcel compartment facility. Even if the mailpiece had already been addressed to a parcel compartment facility before, the mailpiece can re-routed to a different parcel compartment facility if the customer has submitted this.

Moreover, the capacities of the parcel compartment facilities can be taken into consideration for the re-routing of the mailpiece. If the customer has selected a parcel compartment facility, but the system knows that no free compartments are available in that particular parcel compartment facility, an alternative parcel compartment facility that has available compartments can be selected.

Therefore, a component that is in communication with the data processing unit 32 preferably knows the current occupation status and reservations for announced mailpieces for all parcel compartment facilities of the mail transportation and distribution system. In a practical manner, this component is likewise arranged in the central management unit 41.

On the basis of the re-routing instruction of the customer in conjunction with the read customer ID, a destination is ascertained and this destination is associated with the unambiguous identification of the mailpiece. Subsequently, the mailpiece is assigned to the mail distribution center in whose area the destination—and consequently the electronic parcel compartment facility—is located and to which the mailpiece is supposed to be re-routed. This mail distribution center 50 then functions as the incoming mail center for this mailpiece. The mailpiece is transported by a transportation device such as, for example, trains or trucks, to the incoming mail center 50 in question, where it is accepted. Moreover, the data processing unit 32 associates the destination with the appertaining parcel ID of the shipment. At least the information about destination and the parcel ID are transmitted via a data line to an appropriate data processing unit 52 that is in communication with the destination incoming mail center 50. It can also be provided that additional information such as street name, house number, postal code or the dimensions of the mailpiece is likewise transmitted to the data processing unit 52 of the incoming mail center 50.

If the parcel ID of the mailpiece is once again scanned by a reading device 51 in the incoming mail center 50, the data processing unit 52 assigns the mailpiece to the applicable destination and the mailpiece is sorted on the basis of this destination information in such a way as to be assigned to a deliverer and to a delivery district where the appertaining parcel compartment facility 20 is located.

The data processing unit 52 transmits the identification of the mailpiece (parcel ID) and the appertaining destination information to a mobile device 60. This mobile device is an apparatus that the deliverer carries with him on his delivery run to one or more parcel compartment facilities and he uses this device to read the parcel IDs of the mailpieces belonging to his delivery run. The mobile device is, for example, a handheld device to which data from the data processing unit 52 can be transferred. Several mailpieces are assigned to a delivery run within the area of the incoming mail center, thus making an association with a handheld device of a deliverer. In this context, the parcel IDs of the mailpieces belonging to a given delivery run are associated with the handheld device, so that, if necessary, the deliverer can read the parcel IDs from the mailpieces belonging to his delivery run. In a practical manner, the deliverer scans all of the parcel IDs of his mailpieces before he starts his delivery run.

The data can be transmitted from the data processing unit 52 to the mobile device 60, for example, wirelessly via a radio connection or GSM connection. In another embodiment of the invention, prior to the beginning of the delivery run, the handheld device is placed into a transmission device such as, for instance, a handheld dock and the data is transmitted via an interface in the dock. In another embodiment of the invention, the transmission of data to several mobile devices of deliverers does not come directly from the data processing unit 52 itself, but rather, the data processing unit 52 transmits the information to a separate component that then carries out the transmission of the data to several mobile devices.

If a barcode is employed as the parcel ID, the mobile 60 is a barcode scanner, whereas if RFID transponders are used, an appropriate reading device is employed to read data from the transponder. The mobile device also comprises at least one screen to display the mailing-relevant information to the deliverer.

Advantageously, the re-routing instruction is not applied onto the mailpiece in plain text. This reduces the work involved and this approach also entails the advantage that the destination addresses can still be changed, even after the first determination of a re-routing instruction. For instance, if after a mailpiece has been re-addressed, it turns out that there are no free compartments available in the selected parcel compartment facility after all because the parcel compartment facility is not operational, for example, due to a technical defect, the mailpiece can be re-addressed once again. In this context, it would not be advantageous to have to once again apply the destination information onto the mailpiece in plain text.

Also in those cases where the recipient has arranged for different time periods for the delivery to different parcel compartment facilities, the possibility exists that the destination of a mailpiece might change once again after the first re-addressing. Advantageously, after the parcel ID has been acquired, the data processing unit 52 in the incoming mail center once again queries the database 40 of the central management unit in order to inquire about the current specifications for a re-routing. If, for instance, the transportation of the mailpiece from the outgoing mail center to the incoming mail center has been delayed, it can happen that a certain time window will have been exceeded and the recipient now wants the delivery to be made to a different parcel compartment facility. In this case, the mailpiece is re-routed once again.

Therefore, if no re-routing instruction is placed onto the mailpiece in plain text, the deliverer does not know for sure that the instruction was given for the mailpiece to be re-routed to a parcel compartment facility. If the mailpiece had been previously intended for a home address, the deliverer is instructed to make the delivery to a parcel compartment facility even though the destination address on the mailpiece still indicates a home address. Consequently, he cannot be sure whether this is the right procedure or whether he was assigned the wrong mailpiece. Even if the mailpiece had previously been intended for another parcel compartment facility and is now being re-routed to an alternative parcel compartment facility, this does not constitute unambiguous information for the deliverer since he likewise cannot be sure whether this is a correct procedure.

In the method according to an exemplary embodiment of the present invention, when the deliverer scans the parcel ID of a mailpiece, the currently valid destination for this mailpiece can be displayed to him on the screen of the mobile device since this information was previously transferred to the mobile device by the data processing unit 52 of the incoming mail center 50. Consequently, the fact that the destination for the mailpiece is a given parcel compartment facility in the delivery district of the deliverer is shown to him, even if a different address appears on the mailpiece itself. The display of the destination can also be augmented by other information, so that the screen can explicitly show that this is indeed a re-routed mailpiece.

The deliverer transports the mailpiece 10 to the parcel compartment facility 20 and deposits the mailpiece into a free compartment there. This can be a compartment that has been specially reserved for this mailpiece or a compartment belonging to a group of reserved compartments. Subsequently, the customer is notified that the mailpiece has been the deposited into the compartment and can pick the mailpiece at the parcel compartment facility at his own convenience.

The customer can likewise be notified by the central management unit 41 as soon as the parcel compartment facility 20 has informed the management unit that a mailpiece has been deposited into the compartment. The customer can be notified, for instance, by e-mail or by SMS.

In an exemplary embodiment of the invention, already before the mailpiece is deposited, the customer is notified in advance that the mailpiece will be deposited into a parcel compartment facility in the near future. This advance notification can be initiated, for example, as soon as the mailpiece has been assigned in the outgoing mail center to a destination in the form of a parcel compartment facility. Since, at this point in time, it cannot yet be ascertained whether a mailpiece will actually reach the incoming mail center in question, it can be advantageous to only send the advance notification to the customer once the mailpiece has been scanned once again at the incoming mail center. After the mailpiece has been deposited into the parcel compartment facility, the customer receives a notification confirming that the mailpiece has indeed been deposited.

If it is provided that the destination for re-routing a mailpiece can change over the course of the transportation and distribution route, several advance notifications can be sent to the customer indicating that said mailpiece will be deposited. For example, the central management unit 41 might receive from a customer a one-time instruction that a given mailpiece should be re-routed even if that mailpiece has already been scanned at the outgoing mail center and conceivably might even already be en route to an incoming mail center. The new re-routing instruction is transmitted by the central management unit to the data processing unit 52 of the incoming mail center 50.

As soon as the parcel ID of the mailpiece is read in at the incoming mail center, the mailpiece is assigned to a new destination and the mailpiece is sorted accordingly.

If a reservation has already been made for a compartment in a parcel compartment facility, this reservation is cancelled and, if possible, a compartment is reserved in the newly specified parcel compartment facility. If it turns out that there are no free compartments in the parcel compartment facility that had been newly specified by the customer, advantageously, re-addressing of the mailpiece is not carried out and the customer is notified to this effect.

A mailpiece can be re-addressed once again to parcel compartment facilities in the area of the incoming mail center that had been specified first or else outside of this area. In the case of re-addressing within the area of the incoming mail center, the mailpiece is merely assigned to a new parcel compartment facility and it is assigned to another delivery run. If the mailpiece is to be re-addressed to a place at a distance from the incoming mail center because the customer, for example, wishes the delivery to be made to another large city, then the pertinent mail distribution center of this city is ascertained and the mailpiece is transported to that mail distribution center. The newly specified mail distribution center now functions as the incoming mail center and the steps of the method according to the invention can be carried out analogously there.

In an exemplary embodiment of the invention, a shipment notice is sent to a parcel compartment facility 20 if it is ascertained in an outgoing mail center 30 that a mailpiece is intended for a parcel compartment facility. This mailpiece can be one addressed directly to a parcel compartment facility and it can also be a mailpiece that has been re-routed. The data acquired at the outgoing mail center 30 such as customer ID, parcel ID, street name, house number, postal code or the dimensions of the mailpiece can be transmitted directly to the appertaining parcel compartment facility 20 or else via the central management unit 41 and stored in a memory of the parcel compartment facility. When a mailpiece is deposited into a parcel compartment facility, the parcel ID is acquired and the appertaining data record is called up.

For instance, the deliverer scans the barcode of a mailpiece, the automatic facility recognizes the mailpiece on the basis of the parcel ID and displays the relevant data of the mailing data record on a screen. Advantageously, the displayed data includes at least the customer ID and the name of the recipient. Optionally, it is also possible for information regarding requisite COD payments to be displayed. Therefore, the deliverer does not have to enter this data himself, but rather, it is already available to him when a mailpiece is deposited and all he has to do is to confirm it. This simplifies the delivery and considerably reduces the delivery time.

If the shipment notice is employed not only for re-routed mailpieces but also for mailpieces that are regularly addressed to a parcel compartment facility, this notice of the shipment data that is sent to the parcel compartment facility has the advantage that it can be ascertained ahead of time how many mailpieces will be arriving at the parcel compartment facility on a given day.

The information provided about the dimensions also serves as the basis to determine how many compartments and in which size will be needed on that day. The appropriate compartment sizes can be reserved for these mailpieces. In addition, mailpieces that cannot be placed into the automatic parcel facilities because of their dimensions are identified at an early point in time and can be re-routed, for example, to a post office branch. For instance, if it is ascertained at the outgoing mail center that a parcel is addressed to a given parcel compartment facility but that there are no compartments of an adequate size available there, the parcel can be re-routed. Then the parcel can be re-routed to a post office branch or to the home address of the recipient.

A comparison with the information provided by the automatic facility about the number and size of the free compartments also makes it possible to precisely plan the daily capacity utilization for each automatic facility. In this manner, the utilization of the remaining free compartments can be optimally planned, thus avoiding over or under utilization.

Typically, a mailpiece is scanned at the outgoing mail center and is delivered to a parcel compartment facility located in the area of the destination postal distribution center over the course of the next day. In this manner, already one day before the delivery, it is known how many parcels will be deposited into a parcel compartment facility on the next day. This information can then be used to release the remaining free compartments to receive mailpieces for which no notices had been sent out.

For example, it can be provided that mailpieces that had been addressed to the home address of a recipient but could not be delivered because the recipient was not there are then deposited by a deliverer into a parcel compartment facility and the recipient is notified to this effect. For this purpose, the deliverer leaves a notification card for the recipient. As soon as it is known how many directly addressed or re-routed mailpieces are going to be deposited into a parcel compartment facility on a given day, the remaining compartments can be released for mailpieces that are deposited by a deliverer without advance planning. If the destination address of a mailpiece changes during the course of its transportation and distribution route, the reservations can be continuously changed.

When mailpieces having a notification card are to be deposited, then already at the time when the deliverer produces the notification at the home address of the recipient, he has to have information as to whether and in which parcel compartment facility a compartment of an adequate size is available for the mailpiece in question. This information about the occupation status can be transmitted to him, for instance, via the mobile device 60. Since the number of mailpieces directly addressed to a given parcel compartment facility on that day is already known at the beginning of the delivery run, the remaining compartments can be made available for the deliverer to deposit mailpieces with a notification card.

The mailing data containing more than the destination address can also be acquired at the incoming mail center. In contrast, however, the acquisition at the outgoing mail center has the essential advantage that that data is already present in the system at the earliest possible point in time and thus can be used for a mailing notice and for capacity planning. In the incoming mail center, only the parcel ID is once again scanned and the appertaining data is loaded. This means that the procedures during the processing of the mailpiece at the incoming mail center can be carried out more quickly. The relevant contents of the acquired data are transmitted to the incoming mail center and the outgoing mail center then merely confirms that a given mailpiece has arrived at the incoming mail center (IMC).

If information about the occupation status of parcel compartment facilities within the delivery district of the deliverer is not transmitted to his handheld device, it might become necessary to estimate how many compartments should be reserved so that this deliverer can make unplanned deposits of mailpieces. The objective is to make optimal use of the capacity of an automatic facility. In this context, a sufficient number of compartments should be available for the deliverer to make unplanned deposits but, on the other hand, this should not prevent a mailpiece that is directly addressed or re-routed to the automatic facility from being deposited.

The number of free compartments in an automatic facility within a given period of time, for example, is employed for the estimate. A certain margin is added, taking into consideration other factors such as the average time a mailpiece spends in the facility, and then the number of compartments that can be made available for unplanned addressed mailpieces is determined. The estimate is constantly adapted to the conditions that prevail at the individual parcel compartment facilities.

LIST OF REFERENCE NUMERALS

10 mailpiece, parcel
11 mailpiece identification, barcode, RFID transponder
20 electronic parcel compartment facility
30 first mail distribution center, outgoing mail center, OMC
31 reading device, OMC reading device
32 data processing unit, OMC data processing unit
40 database
41 central management unit
50 second mail distribution center, incoming mail center, IMC
51 reading device, IMC reading device
52 data processing unit, IMC data processing unit
60 mobile device, handheld device, scanner

What is claimed is:

1. A method for processing mailpieces within a mail transportation and distribution system comprising at least a first mail distribution center, a second mail distribution center and an electronic parcel compartment facility located in the area of the second mail distribution center, the method comprising:

acquiring data present on a mailpiece in the first mail distribution center, the acquired data comprising at least information that unambiguously identifies the mailpiece as well as information about the recipient of the mailpiece, wherein destination information for an electronic parcel compartment facility is associated with the information that unambiguously identifies the mailpiece;

transmitting the acquired data to a first data processing unit of the first mail distribution center;

comparing the data indicating the recipient of the mailpiece with data about registered customers stored in a database;

acquiring a data record that is stored for a customer in the database on the basis of the acquired data about the recipient;

providing the acquired data record of a customer to the first data processing unit;

ascertaining a re-routing instruction from the data record of the customer;

ascertaining a second mail distribution center located in the area of the electronic parcel compartment facility;

sorting the mailpiece in the first mail distribution center on the basis of the destination information;

transmitting the acquired data from the mailpiece and the destination information by the first data processing unit to a second data processing unit, the second data processing unit being of the second mail distribution center;

transporting the mailpiece to the second mail distribution center located in the area of the electronic parcel compartment facility;

acquiring the information that unambiguously identifies the mailpiece with a reading device of the second mail distribution center;

determining the destination of the mailpiece on the basis of the information that unambiguously identifies the mailpiece;

sorting the mailpiece in the second mail distribution center on the basis of the destination information; and transmitting the information that unambiguously identifies the mailpiece as well as the associated destination information to a mobile device;

ascertaining the re-routing instruction from the data record of the customer;

associating destination information with the electronic parcel compartment facility; and reserving a compartment in the electronic parcel compartment facility by a data processing unit of a mail distribution center.

2. The method recited in claim 1, wherein the reservation of the compartment in the electronic parcel compartment facility for the mailpiece is made by the first data processing unit of the first mail distribution center.

3. The method recited in claim 1, wherein the reservation of the compartment in the electronic parcel compartment facility for the mailpiece is made by the second data processing unit of the second mail distribution center.

4. The method recited in claim 1, wherein the mobile device has a screen and device to acquire the information that unambiguously identifies the mailpiece, and wherein the destination information that is associated with the information that unambiguously identifies the mailpiece is displayed on the screen when the information is acquired from the mailpiece.

5. The method recited in claim 1, wherein the information that unambiguously identifies the mailpiece comprises data that is encrypted in a barcode.

6. The method recited in claim 1, wherein the information that unambiguously identifies the mailpiece is stored in an RFID transponder.

7. The method recited in claim 1, comprising transmitting the information that unambiguously identifies the mailpiece as well as the information about the recipient of the mailpiece to the parcel compartment facility before the mailpiece is deposited into the parcel compartment facility.

8. An arrangement of devices for processing mailpieces, whereby the arrangement comprises at least a first mail distribution center, a second mail distribution center and an electronic parcel compartment facility, the arrangement comprising:

a database that is in communication with the first mail distribution center and/or with the second mail distribution center, where re-routing instructions from registered recipients are stored;

a first reading device for acquiring data present on a mailpiece, the first reading device being associated with the first mail distribution center;

a second reading device for acquiring data present on the mailpiece, the second reading device being associated with the second mail distribution center;

a first data processing unit for processing the acquired data, the first data processing unit being associated with the first mail distribution center, the first data processing unit associated with the first mail distribution center being adapted to ascertain destination information from a re-routing instruction of a registered recipient and to associate this destination information with information that unambiguously identifies the mailpiece;

a second data processing unit for processing the acquired data, the second data processing unit being associated with the second mail distribution center;

wherein the first data processing unit associated with the first mail distribution center is adapted to transmit the data acquired by the reading device to the second data processing unit of the second mail distribution center; and wherein a mobile device is in communication with the second data processing unit associated with the second mail distribution center, whereby the second data processing unit is adapted to transmit to the mobile device at least the information that unambiguously identifies the mailpiece and the associated destination information; and wherein the re-routing instruction is ascertained from the data record of the customer and destination information and associated with an electronic parcel compartment facility;

whereby a compartment in the electronic parcel compartment facility is reserved by a data processing unit of a mail distribution center.

9. The arrangement of devices recited in claim 8, wherein the database is in communication with a central management unit that is adapted to store and query an occupation status of the compartments of the electronic parcel compartment facility.

10. The arrangement of devices recited in claim 8, wherein the first data processing unit of the first mail distribution center, the second data processing unit of the second mail distribution center and/or a central management unit is/are adapted to transmit the data acquired by a reading device in the first mail distribution center to the electronic parcel compartment facility.

11. A mail transportation and distribution system for processing mailpieces comprising at least a first mail distribution center, a second mail distribution center and an electronic parcel compartment facility located in the area of the second mail distribution center, the mail transportation and distribution system comprising:

means for acquiring data present on a mailpiece in the first mail distribution center, the acquired data comprising at least information that unambiguously identifies the mailpiece as well as information about the recipient of the mailpiece, wherein destination information for an electronic parcel compartment facility is associated with the information that unambiguously identifies the mailpiece;

means for transmitting the acquired data to a first data processing unit of the first mail distribution center;

means for comparing the data indicating the recipient of the mailpiece with data about registered customers stored in a database;

means for acquiring a data record that is stored for a customer in the database on the basis of the acquired data about the recipient;

means for providing the acquired data record of a customer to the first data processing unit;

means for ascertaining a re-routing instruction from the data record of the customer;

means for ascertaining a second mail distribution center located in the area of the electronic parcel compartment facility;

means for sorting the mailpiece in the first mail distribution center on the basis of the destination information;

means for transmitting the acquired data from the mailpiece and the destination information by the first data processing unit to a second data processing unit, the second data processing unit being of the second mail distribution center;

means for transporting the mailpiece to the second mail distribution center located in the area of the electronic parcel compartment facility;

means for acquiring the information that unambiguously identifies the mailpiece with a reading device of the second mail distribution center;

means for determining the destination of the mailpiece on the basis of the information that unambiguously identifies the mailpiece;

means for sorting the mailpiece in the second mail distribution center on the basis of the destination information;

means for transmitting the information that unambiguously identifies the mailpiece as well as the associated destination information to a mobile device;

means for ascertaining the re-routing instruction from the data record of the customer;

means for associating destination information with an electronic panel compartment facility; and means for reserving a compartment in the electronic parcel compartment facility by a data processing unit of a mail distribution center.

* * * * *